(12) United States Patent
Otsuka et al.

(10) Patent No.: US 6,741,859 B2
(45) Date of Patent: *May 25, 2004

(54) CODE-DIVISION-MULTIPLE-ACCESS MOBILE COMMUNICATION SYSTEM ACCOMODATING INCREASED NUMBER OF MOBILE STATIONS

(75) Inventors: Yasunori Otsuka, Yokohama (JP); Jun Oyama, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/411,072

(22) Filed: Oct. 4, 1999

(65) Prior Publication Data

US 2003/0137951 A1 Jul. 24, 2003

(30) Foreign Application Priority Data

Oct. 20, 1998 (JP) .......................................... 10-297709

(51) Int. Cl.⁷ ................................................. H04Q 7/20

(52) U.S. Cl. ........................ 455/438; 455/442; 455/453; 370/332

(58) Field of Search ................................. 455/442, 443, 455/444, 453; 370/331, 332, 333, 334, 335

(56) References Cited

U.S. PATENT DOCUMENTS

| | | | | |
|---|---|---|---|---|
| 5,953,661 | A | * | 9/1999 | Schwinghammer et al. ........................... 455/423 |
| 5,960,335 | A | * | 9/1999 | Umemoto et al. ........ 455/226.2 |
| 6,081,714 | A | * | 6/2000 | Wakizaka .................... 455/437 |
| 6,094,581 | A | * | 7/2000 | Fried et al. ................. 455/449 |
| 6,360,106 | B1 | * | 3/2002 | Besson ........................ 455/561 |
| 6,385,460 | B1 | * | 5/2002 | Wan ........................... 455/434 |
| 6,393,003 | B1 | * | 5/2002 | Lee ............................. 370/331 |

FOREIGN PATENT DOCUMENTS

| | | |
|---|---|---|
| JP | 5-252098 | 9/1993 |
| JP | 6-326653 | 11/1994 |

* cited by examiner

*Primary Examiner*—Nick Corsaro
(74) *Attorney, Agent, or Firm*—Katten Muchin; Zavis Rosenman

(57) ABSTRACT

A system for mobile communication based on code division multiple access includes base stations, each of which communicates with mobile stations by using a plurality of radio frequencies covering respective cells, the respective cells including a first cell covered by a first radio frequency and a second cell covered by a second radio frequency. The system further includes a base-station controller which communicates with the base stations, and controls the mobile stations to switch from the first cell of a first base station to the first cell of a second base station via a soft hand-off operation and switch between the first cell and the second cell within any base station via a hard hand-off operation, the base-station controller providing the mobile stations with no direct switch between the second cell of the first base station and the second cell of the second base station.

6 Claims, 17 Drawing Sheets

CODE-DIVISION-MULTIPLE-ACCESS MOBILE COMMUNICATION SYSTEM ACCOMODATING INCREASED NUMBER OF MOBILE STATIONS

BACKGROUND OF THE INVENTION

1. Field of the Invention

The present invention relates to cell designs of a mobile communication system that is based on a CDMA (code division multiple access) scheme typically used in an IS-95-A scheme.

2. Description of the Related Art

As a number of customers increases in a mobile-communication system, there is an increasing need for a system that can accommodate a large number of customers.

FIG. 10 is an illustrative drawing showing a configuration of a typical related-art mobile-communication system.

In the system of FIG. 10, a public telephone network is connected to a mobile network via mobile switch center MSC. The mobile switch center MSC has base station controllers BSC connected thereto, and the base station controllers BSC in turn have base stations BTS connected thereto. Each of the base stations BTS communicates with mobile stations MS residing in its cell (i.e., area of control) so as to render services such as a telephone service. In such a mobile-communication system, a CDMA (code division multiple access) scheme, a TDMA (time division multiple access) scheme, or a FDMA (frequency division multiple access) scheme is typically employed for the purpose of providing multiple accesses.

[CDMA Scheme]

The CDMA scheme is used in the IS-95-A scheme. In the CDMA scheme, a base station uses the same frequency for communicating with different mobile stations residing in its own cell. Channels for communicating with respective mobile stations are established by using predetermined codes, which are called dispersion codes, and serve to discriminate respective signals of mobile stations. Data exchanged between the base station and a mobile station is encrypted (frequency dispersed) by convolving the data with a dispersion code. On the receiver side, the received data is further convolved with the same dispersion code in order to identify a channel.

In the CDMA scheme, a transmitter side of a base station uses two types of dispersion codes. One is a short code, which is used for discriminating the base station from other base stations. The other is a long code, which is used for discriminating a mobile station as a destination. These two codes are convolved with transmission data.

Further, a transmitter side of a mobile station uses two types of dispersion codes. One is a short code again, which is used by a base station for obtaining a data timing of data received from the mobile station. The other is a long code, which serves to discriminate the mobile station from other mobile stations. These two codes are convolved with transmission data.

Such dispersion codes as described above are used for channel-discrimination purposes in the CDMA scheme. Because of this, each mobile station can selectively pick up a channel directed to itself from a relevant base station even when each mobile station simultaneously receives signals of the same radio frequency from a plurality of base stations.

In this manner, the CDMA scheme allows base stations to transmit the same frequency to all the mobile stations, and allows all the mobile stations to transmit the same frequency to the base stations. Please note, however, that the transmission frequency of the base stations is different from the transmission frequency of the mobile stations.

[Hand-off of CDMA Scheme]

"Hand-off" refers to an operation performed when a mobile station moves from a cell of a given base station to a cell of an adjacent base station while engaging in a call. The CDMA scheme performs a soft hand-off operation to insure a continuous call without a break.

During a period of a soft hand-off state, two base stations having bordering cells transmit the same data received from the base-station controller to a mobile station currently positioned around the border of the cells. The mobile station combines the received signals sent from the two base stations, thereby improving a reception gain. Each of the two base stations receives a signal sent from the mobile station, and forwards the signal to the base-station controller. The base-station controller compares the two signals sent from the two respective base stations, and select one having a better signal quality. Selected data is then sent to the mobile-switch center. In this manner, a call never breaks during a soft hand-off period as long as either one of the two base stations securely receives signals from the mobile station.

A mobile-communication system based on the TDMA scheme typically employs a different type of a hand-off operation called a hard hand-off. In a hard hand-off operation, a radio frequency is switched after a mobile station comes sufficiently close to a first base station when moving from a second base station to the first base station with an aim of achieving a secure shift. This means, however, that the mobile station becomes distanced from the second base station before the hand-off operation is actually performed. A hard hand-off thus requires a greater transmission power than a soft hand-off. Further, a communication suffers a brief moment of disconnection at the time of switching.

Even the CDMA scheme may use a hard hand-off operation when two base stations cannot use the same frequency to provide respective services to a mobile station, for example. In such a case, a brief moment of disconnection is observed before a switched channel is reconnected.

[Number of Subscribers in CDMA]

The CDMA scheme achieves division of channels by use of codes, and uses the same radio frequency shared by a large number of mobile stations. When a base station attempts to receive a signal from a given mobile station, other signals transmitted from other mobile stations using the same radio frequency appear to be nothing but sources of interferences for the base station. Namely, an increase in the number of mobile stations adding to the number of transmission signals is tantamount to an increase in noise. The acceptable number of mobile stations that can communicate using the same radio frequency is obviously limited by the degree of interference. It is important, therefore, to reduce interferences by using as small transmission power as possible for each mobile station. This is the most important issue to be addressed in deciding the number of mobile stations than can be accommodated in the same cell, i.e., the number of customers of a single system.

In order for a mobile station to reduce its transmission power around a border of cells, a soft hand-off is suitable because it requires only a minimum transmission power that achieves communication with the closest base station.

As a mobile station shifts its position, a building may come into a line between the mobile station and the base station, or may go out of the line. When the mobile station is obscured by a building, the base station in the CDMA system increases transmission power in response to weakening signals if the CDMA system is not using a soft hand-off. Such an increase in transmission power is an increase of noises as far as other mobile stations are concerned. When the mobile station comes out from behind the building, the transmission power is decreased. Such an adjustment of transmission power is repeated as the mobile station moves.

In a system which employs a soft hand-off, even when a base station is obscured by a building, a mobile station may maintain a connection with another mobile station. In such a case, necessary transmission power is smaller compared to the case of no soft hand-off operation. Namely, a noise effect on other mobile stations is smaller.

Accordingly, a system employing the soft hand-off operation can accommodate a larger number of mobile stations than a system using no soft hand-off, thereby achieving a smaller system cost per user.

[System Configuration of CDMA Scheme]

FIG. 11 is an illustrative drawing showing a configuration of areas (cells) of related-art base stations employing the CDMA scheme.

As previously described, the number of channels that a single base station can use with a common radio frequency is limited by an effect of signal interference. When the number of customers (mobile stations) is larger than the number of channels that can be accommodated by the same frequency, a cell configuration is designed such that a single base station uses different radio frequencies for implementing a plurality of cells. For example, a base station that renders services to more mobile stations than an acceptable number of mobile stations for a single radio frequency needs to implement cells using different radio frequencies.

As shown in FIG. 11, a base station 1 implements a plurality of cells by using a plurality of radio frequencies RF1, RF2, and RF3. Areas covered by the respective radio frequencies RF1, RF2, and RF3 are completely overlapped, and encompass the base station 1 with a radius R1. Further, the areas of the respective radio frequencies RF1, RF2, and RF3 of the base station 1 partially overlap corresponding areas of respective radio frequencies RF1, RF2, and RF3 of a base station 2. This partial overlapping is provided in order to permit a soft hand-off operation between areas using the same radio frequency.

[Selection of Soft Hand-off or Hard Hand-off]

In the CDMA scheme, a decision has be to made as to which one of the soft hand-off and the hard hand-off is used at a border of adjoining cells. To this end, a mobile station obtains the following threshold values from a base station.

1) pilot strength usable for communication
2) pilot strength to trigger hand-off
3) pilot strength lower than the above A mobile station starts communicating with a base station for location update or the like when finding this base station before any other base stations by picking up a signal from this base station that exceeds "pilot strength usable for communication".

If a user of the mobile station requests a call, the mobile station sends a call request to the base station. A mobile station constantly searches for pilot channels of surrounding cells, and monitors received strengths of the pilot channels. If any one of the received strengths crosses over from one category to another category classified by the above conditions 1) through 3), the mobile station reports the received strengths of pilot channels to the base-station controller via the currently connected base station.

Based on the reported strengths of pilot channels of surrounding cells, the base-station controller selects one of the following operations.

1) soft hand-off
2) hard hand-off
3) maintain current state

If a soft hand-off or a hard hand-off is selected, a hand-off switch message is sent to the mobile station, thereby prompting the mobile station to switch over to one of the surrounding cells.

In this process, a decision as to which one of the two hand-off operations is selected is made by taking into account the following factors.

1) soft hand-off

Conditions that must be satisfied in order to select a soft hand-off are as follows:

a received pilot strength of a surrounding cell that is reported by the mobile station exceeds "pilot strength usable for communication"; and a target cell (a surrounding cell that is currently evaluated) has an available resource for the same frequency and the same frame offset as those of the currently used cell.

Such a soft hand-off achieves a switch to the target cell using the same radio frequency and the same frame offset as those of the currently used cell.

In the example of FIG. 11, each of the base stations 1 and 2 uses the radio frequencies RF1, RF2, and RF3 to communicate with mobile stations. Even though a plurality of the radio frequencies RF1, RF2, and RF3 are used, overlapping is provided between the cells using the same frequency. A soft hand-off thus can be performed for a mobile station 3 between the cells using the same frequency.

The frame offset refers to a position in a series of time slots that are used for exchanging communication signals of mobile stations between a base station and a base-station controller on a communication line utilizing a time-division multiplex scheme. A soft hand-off can not be performed unless a position of a time slot of a mobile station is the same in a base station after a hand-off as was in a base station before the hand-off. Therefore, a check has to be made as to whether a frame offset (i.e., a particular time slot) used in a base station before a hand-off is available in a base station to be used after the hand-off. That is, whether the same frame offset is available in the base station to be used needs to be checked in order to perform a soft hand-off operation.

2) hard hand-off

Conditions that must be satisfied in order to select a hard hand-off are as follows:

a received pilot strength of a surrounding cell that is reported by the mobile station exceeds "pilot strength to trigger hand-off";

a pilot strength of a currently used cell is below "pilot strength usable for communication";

a target cell has available resources; and the target cell does not have an available space for the same frequency and the same frame offset as those of the currently used cell.

A hard hand-off may include a case where a switch is made to a different radio frequency when moving into a target cell or a case where a switch is made to a different frame offset while using the same radio frequency.

3) maintaining a current status

Conditions that must be satisfied in order to maintain a current status are as follows.

a received pilot strength of a surrounding cell that is reported by the mobile station exceeds "pilot strength to trigger hand-off".

a pilot strength of a currently used cell is above "pilot strength usable for communication"; and a target cell has no available resources, or does not have an available space for the same frequency and the same frame offset as those of the currently used cell.

When a decision is made to keep a current status, no hand-off is performed, and a connection with the current base station remains as it is.

In this manner, a hand-off operation is performed by evaluating received pilot strengths that are reported to a base-station controller from a mobile station. Decisions as to whether to perform a hand-off operation and which type of hand-off operation is to be performed are made by the base-station controller. To this end, the base-station controller needs to keep track of locations of and frequencies used by all the mobile stations.

[Details of Hard Hand-off in CDMA]

FIG. 12 is an illustrative drawing showing a hard hand-off operation performed by a mobile station.

In FIG. 12, the base stations 1 and 2 are under the control of a base-station controller 4. Ellipses drawn above the base stations 1 and 2 illustrate cells (areas) covered by the radio frequencies RF1 and RF2. Points a through f indicate positions of the mobile station 3. What is shown in the middle of the figure demonstrates pilot strengths of the base stations 1 and 2 that are received by the mobile station 3 as it moves along. In this presentation, a pilot strength x indicates a "pilot strength usable for communication", and a pilot strength y indicates a "pilot strength to trigger a hand off".

In the following, a series of operations from when the mobile station 3 starts communication with the base station 1 at the point a by using the radio frequency RF1 to when the mobile station 3 finally reaches the point f will be described.

When the mobile station 3 reaches the point c, the received pilot strength of the base station 2 exceeds the pilot strength y (i.e., "pilot strength to trigger a hand-off"). The mobile station 3 reports this change to the base-station controller 4 via the base station 1.

The base-station controller 4 makes a resource request to the base station 2 with an aim of performing a soft hand-off operation. In this example, however, there is no resources, and a current status is maintained.

When the mobile station 3 moves to the point e, the received pilot strength of the base station 1 becomes smaller than the pilot strength x (i.e., "pilot strength usable for communication). The mobile station 3 reports this to the base-station controller 4 via the base station 1. The base-station controller 4 instructs the base station 1, the base station 2, and the mobile station 3 to carry out a hard hand-off operation. The hard hand-off operation is carried out at the point e. In this manner, the mobile station 3 communicates with the base station 1 from the point a to the point e, and communicates with the base station 2 from the point e to the point f.

[Details of Soft Hand-off in CDMA]

FIG. 13 is an illustrative drawing showing a soft hand-off operation performed by a mobile station. In FIG. 13, the same numerals and symbols as those of FIG. 12 are used for referring to the same items.

In the following, a series of operations from when the mobile station 3 starts communication with the base station 1 at the point a by using the radio frequency RF1 to when the mobile station 3 finally reaches the point f will be described.

When the mobile station 3 reaches the point c, the received pilot strength of the base station 2 exceeds the pilot strength y (i.e., "pilot strength to trigger a hand-off"). The mobile station 3 reports this change to the base-station controller 4 via the base station 1. The base-station controller 4 makes a resource request to the base station 2 with an aim of performing a soft hand-off operation. When resources are secured, the base-station controller 4 instructs the base stations 1 and 2 and the mobile station 3 to carry out a soft hand-off operation, so that the mobile station 3 starts communicating with both of the base stations 1 and 2.

When the mobile station 3 moves to the point e, the received pilot strength of the base station 1 becomes smaller than the pilot strength x (i.e., "pilot strength usable for communication). The mobile station 3 reports this to the base-station controller 4 via the base stations 1 and 2. The base-station controller 4 instructs the base station 1, the base station 2, and the mobile station 3 to end the soft hand-off operation. As a result, the mobile station 3 communicates only with the base station 2. In this manner, the mobile station 3 communicates with the base station 1 from the point a to the point e, and communicates with the base station 2 from the point c to the point f. Between the point c and the point e, the soft hand-off operation is being engaged, allowing simultaneous communications with the two base stations.

[Configuration of Base Station and Base-Station Controller]

FIG. 14 is a block diagram showing a related-art configuration of a base station and a base-station controller.

The base station includes a plurality of identical configurations as many as there are used radio frequencies (i.e., three in this example since three radio frequencies RF1, RF2, and RF3 are used).

The base station is provided with two antennas with respect to each radio frequency for signal exchanges with mobile stations. One antenna is used for transmission of signals, and the other antenna is used for receiving signals.

On a receiver side, RF-conversion units $30_1$ through $30_3$ convert a radio signal received by the antenna into an intermediate frequency signal, which is then demodulated by a QPSK-modulation/demodulation unit 31 before being sent to CDMA-modulation/demodulation units $32_0$ through $32_n$. The CDMA-modulation/demodulation units $32_0$ through $32_n$ are provided as many as there are mobile stations that can communicate simultaneously with the base station. In this example, therefore, the base station can establish simultaneous communications with n+1 mobile stations. The CDMA-modulation/demodulation units $32_0$ through $32_n$ convolve the received signals with dispersion codes so as to attend to an inverse-dispersion process of the CDMA signals. The dispersion codes are determined by a BTS-control unit 33 in advance. A BSC-connection unit 34 receives the received signals having the inverse-dispersion process applied thereto, and forwards the them to the base-station controller.

On a transmitter side, the BSC-connection unit 34 receives transmission data from the base-station controller, and sends it to one of the CDMA-modulation/demodulation units $32_0$ through $32_n$ selected in advance by the BTS-control unit 33. The selected one of the CDMA-modulation/demodulation units $32_0$ through $32_n$ convolves the transmission data with a dispersion code to attend to a CDMA-dispersion process. Further, the QPSK-modulation/demodulation unit 31 applies a QPSK modulation to generate an intermediate frequency signal. One of the RF-conversion units $30_1$ through $30_3$ converts the intermediate signal into a radio transmission signal, and transmits it via the antenna.

FIG. 15 is a block diagram of a RF-conversion unit 30 of the base station. The RF-conversion unit 30 is any one of the RF-conversion units $30_1$ through $30_3$.

On the receiver side of the RF-conversion unit 30, a band-pass filter 301 filters a received radio signal, and, then, a low-noise amplifier 302 amplifies the filtered signal. A multiplier 303 multiplies the amplified signal by an output of a receiver local-signal generator 306-1 to obtain an intermediate frequency signal.

On a transmitter side of the RF-conversion unit 30, an intermediate frequency signal is filtered by a band-pass filter 304. A multiplier 305 multiplies the filtered signal by an output of a transmitter local-signal generator 306-2 to generate a radio transmission signal. The radios transmission signal is amplified by a high-power amplifier 308, and, then, is transmitted from the antenna.

With reference to FIG. 14 again, on a receiver side of the base-station controller, data sent from a plurality of base stations are received by a BTS-connection unit 11, and are provided to a communication setting unit 12. The communication setting unit 12 supplies the received data to corresponding selection units $13_0$ through $13_m$ as a given chunk of the received data has an allocated selection unit. This allocation is determined by a BSC-control unit 16. Each of the selection units $13_0$ through $13_m$ selects one of the two received data chunks that has fewer errors than the other during a period of a soft hand-off operation, and, then, applies an audio-decoding process before sending the selected data to a MSC-connection unit 15. The MSC-connection unit 15 combines data supplied from the selection units $13_0$ through $13_m$ to generate frames, and sends these frames to a mobile-switch center 5.

On a transmitter side of the base-station controller, frames received from the mobile-switch center 5 are processed to extract transmission data, which is then sent to one of the selection units $13_0$ through $13_m$ that is preselected by the BSC-control unit 16. The one of the selection units $13_0$ through $13_m$ applies an audio-coding process before sending the transmission data to the communication setting unit 12. The transmission data is then transmitted via the BTS-connection unit 11 to a destination that is specified by the BSC-control unit 16.

[Configuration of Selection Unit]

FIG. 16 is a block diagram of a selection unit of the base-station controller. The selection unit 13 of FIG. 16 is any one of the selection units $13_0$ through $13_m$.

The selection unit 13 includes a first buffer 131, a second buffer 132, a third buffer 133, an audio decoding unit 134, an audio coding unit 135, a buffer-control unit 136, a demultiplexer 137, a first check unit 138, a second check unit 139, and a selector 140.

On a receiver side of the selection unit 13, the demultiplexer 137 receives data, and supplies a first one of two data chunks consecutively received to the first check unit 138 and a second one of the two data chunks to the second check unit 139 if a soft hand-off operation is being engaged. The buffer-control unit 136 is notified when the data transfer is completed. The first check unit 138 and the second check unit 139 check errors in the received data, and send the received data to the first buffer 131 and the second buffer 132, respectively. Results of the error checks are provided to the buffer-control unit 136. The buffer-control unit 136 controls the selector 140 to select one of the two data chunks that has the smallest errors, and controls a corresponding one of the first buffer 131 and the second buffer 132 to supply the received data to the audio decoding unit 134. These operations as described above are repeated for each frame. If the soft hand-off operation is not being engaged, the demultiplexer 137 supplies data to the first check unit 138 as it receives the data.

On a transmitter side of the selection unit 13, the audio coding unit 135 applies audio-coding processing to transmission data, and sends the processed transmission data to the third buffer 133. Under the control of the buffer-control unit 136, the third buffer 133 supplies the transmission data to the communication setting unit 12.

[Configuration of Mobile Station]

FIG. 17 is a block diagram of a receiver portion of a related-art mobile station.

The mobile station of FIG. 17 includes a RF-conversion unit 21, a QPSK-demodulation unit 22, a searcher 23, a finger-control unit 24, a first finger 25, a second finger 26, a control unit 27, a maximum-ratio-integration unit 28, a signal processing unit 29, and an audio decoding unit 210.

A signal received at the antenna is supplied to the RF-conversion unit 21, where the received signal is changed into an intermediate frequency signal. The intermediate frequency signal is demodulated by the QPSK-demodulation unit 22, and, then, the demodulated signal is provided to the searcher 23, the first finger 25, and the second finger 26.

The searcher 23 includes a searcher-control unit 231, a correlation unit 233, a peak-detection unit 234, and a timing-generation unit 235. The searcher-control unit 231 indicates a dispersion code to be searched for and a time span during which the search is to be conducted. The correlation unit 233 detects a correlation between a pilot signal of a currently used base station and a pilot signal of a surrounding base station as these pilot signals are contained in the demodulated received signals. The peak-detection unit 234 detects a peak in an output of the correlation unit 233, and the timing-generation unit 235 generates a timing signal indicative of a timing of the peak. The timing signal is supplied to the finger-control unit 24. The finger-control unit 24 obtains a delay profile of the received signal of the currently used base station by using the timings reported from the searcher 23. In a descending order of the correlation in the delay profile, the finger-control unit 24 notifies the first finger 25 and the second finger 26. Further, the finger-control unit 24 reports the received pilot strength of the surrounding base station to the control unit 27.

The first finger 25 and the second finger 26 have the same configuration. Each finger includes a timing-synchronization unit 251, a correlation unit 252, and a correlation-value detecting unit 253. The correlation unit 252 calculates a correlation between the received signal and the dispersion code that is specified by the control unit 27 in advance. The correlation-value detecting unit 253 detects a correlation value at a timing specified by the timing-synchronization unit 251, and the detected correlation value is supplied to the maximum-ratio-integration unit 28. The maximum-ratio-integration unit 28 attends to a maximum-ratio-integration process with respect to the correlation values supplied from the first and second fingers 25 and 26, and supplies the integrated signal to the signal processing unit 29. The signal processing unit 29 attends to error corrections, and the audio decoding unit 210 reproduces audio from the error-corrected signals. Here, if the data output from the signal processing unit 29 is a control message, the control message is supplied to the control unit 27.

In the related-art configuration as described above, a single station may have a plurality of cells using a plurality of radio frequencies RF1, RF2, and RF3 as shown in FIG. 11. In such a case, a soft hand-off can take place in any one of the radio frequencies RF1, RF2, and RF3, and, thus, hardware and software for providing a soft hand-off function are required with respect to each radio frequency. Namely, every single one of the selection units $13_0$ through $13_m$ of the base-station controller needs to have a function to select one of the two received data sets in order to achieve a soft-hand-off operation. This results in an undesirable cost increase.

Between adjacent base stations, areas covered by the same radio frequency are overlapped at a peripheral portion. When a hard hand-off operation is engaged because a soft hand-off is not available due to lack of resources, the mobile station 3 may move deep into a new cell to arrive at the point e while keeping communication with the base station of an old cell. In such a case, signals transmitted from the base station 2 appear to be nothing but noises to the mobile station 3. Further, the transmission signals of the base station 2 are stronger than transmission signals coming from the base station 1 that is currently used. Namely, the signals transmitted from the base station 2 interferes with communications of the mobile station 3 residing within the cell of the base station 1. These factors further limits the number of mobile stations that can be used in the system.

As shown in FIG. 12, when the mobile station 3 having a connection with the base station 1 is located at the point e, the mobile station 3 needs to transmit signals with such a strong power as to make them reach the base station 1 by covering the distance r1. As far as the base station 2 located only a distance r5 from the mobile station 3 is concerned, such strong transmission from the mobile station 3 at the point e is a source of interference against signals coming from other mobile stations. This factor further limits the number of mobile stations that can be used in the system.

In the related art, a soft hand-off operation should be usable regardless of what radio frequency is used by a mobile station. In this configuration, a mobile station shifting a position thereof may come close to a neighboring base station, resulting in a change in a received pilot strength. Because of this, a delay profile needs to be constantly monitored for all the radio frequencies with respect to the neighboring base stations in addition to a delay profile of multi-path components. As a result, it is necessary to keep the searcher 23 in operation all the time for monitoring purposes. This can be achieved, however, at a cost of an increase in power consumption.

Accordingly, there is a need for a CDMA mobile communication system which can accommodate a large number of mobile stations at a low cost while providing soft hand-off services to the mobile stations.

SUMMARY OF THE INVENTION

Accordingly, it is a general object of the present invention to provide a CDMA mobile communication system which can satisfy the need described above.

It is another and more specific object of the present invention to provide a CDMA mobile communication system which can accommodate a large number of mobile stations at a low cost while providing soft hand-off services to the mobile stations.

In order to achieve the above objects according to the present invention, a system for mobile communication based on code division multiple access includes base stations, each of which communicates with mobile stations by using a plurality of radio frequencies covering respective cells, the respective cells including a first cell covered by a first radio frequency and a second cell covered by a second radio frequency. The system further includes a base-station controller which communicates with the base stations, and controls the mobile stations to switch from the first cell of a first base station to the first cell of a second base station via a soft hand-off operation and switch between the first cell and the second cell within any base station via a hard hand-off operation, the base-station controller providing the mobile stations with no direct switch between the second cell of the first base station and the second cell of the second base station.

In the system as described above, the plurality of radio frequencies are used for communication purposes, yet the number of radio frequencies permitting a soft hand-off operation between adjacent base stations is limited. In this configuration, device elements on the base-station side can be simplified because there is no need for device elements to perform a soft hand-off function with respect to some of those radio frequencies. This results in a lower device cost.

Further, a mobile station currently using a radio frequency that does not permit a soft hand-off operation can stop its search operation from seeking pilot signals of surrounding base stations. This reduces power consumption in the mobile station.

According to another aspect of the present invention, the respective cells covered by the plurality of radio frequencies have different area sizes (e.g., different radii). In this configuration, mobile stations communicating via one of the smaller cells can reduce transmission power thereof compared to when communicating via one of the larger cells. Such reduction in transmission power results in a decreased effect of interference on other mobile stations. Further, the mobile station communicating via one of the smaller cells ends up keeping a distance from adjacent base stations. This mobile station thus suffers only a limited degree of interference from signals transmitted by surrounding base stations. Consequently, the configuration of the present invention increases the number of mobile stations that can be accommodated by a single base station.

In the manner as described above, the present invention can provide a CDMA mobile communication system which can accommodate a large number of mobile stations at a low cost while providing soft hand-off services to the mobile stations.

Other objects and further features of the present invention will be apparent from the following detailed description when read in conjunction with the accompanying drawings.

DESCRIPTION OF THE PREFERRED EMBODIMENTS

In the following, a principle and embodiments of the present invention will be described with reference to the accompanying drawings.

Figure 1:
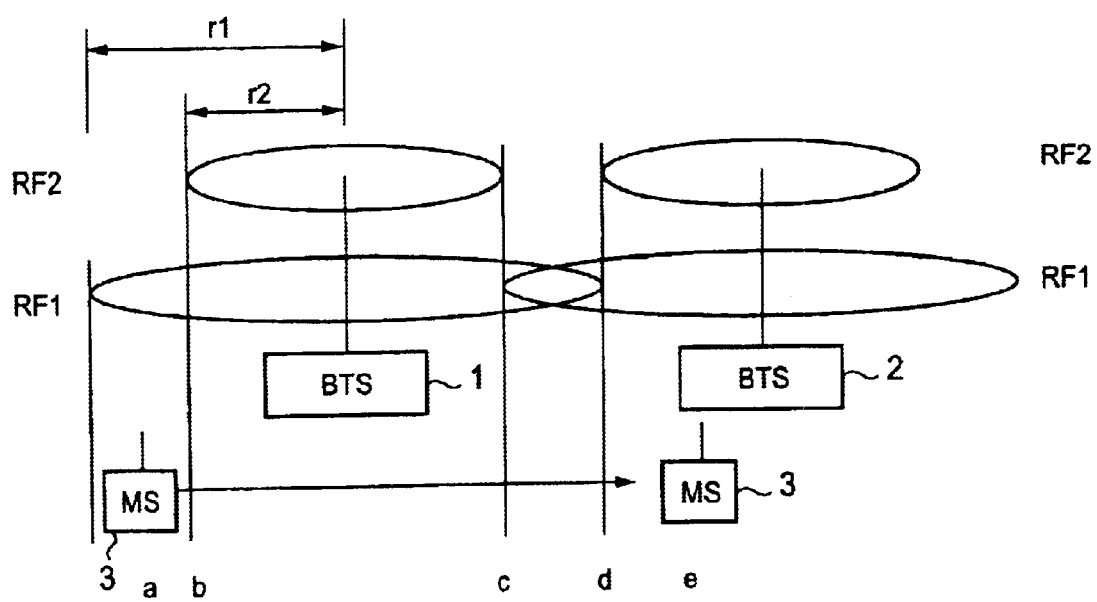
FIG. 1 is an illustrative drawing showing a CDMA mobile communication system according to a principle of the present invention.

FIG. 1 is an illustrative drawing showing a CDMA mobile communication system according to a principle of the present invention.

The system of FIG. 1 includes a CDMA base station 1, another CDMA base station 2, and a CDMA mobile station 3. The base station 1 uses a plurality of radio frequencies RF1 and RF2 to cover respective areas, which are represented by ellipses in FIG. 1.

According to the present invention, the respective areas of the radio frequencies RF1 and RF2 cover different ranges as shown in FIG. 1. Namely, the area of the radio frequency RF1 has a radius r1, and the area of the radio frequency FR2 has a radius r2. Further, the area of the radio frequency RF1 of the base station 1 overlaps the area that the base station 2 covers by using the same radio frequency RF1, thereby making it possible to perform a soft hand-off operation between these areas.

In the following, a description will be given with regard to a case where the mobile station 3 moves from the point a to the point e.

The mobile station 3 communicates with the base station 1 by using the radio frequency RF1 when it is located between the point a to the point b. As the mobile station 3 arrives at the point b, a hard hand-off operation is performed to switch from the radio frequency RF1 to the radio frequency RF2.

Between the point b and the point c, the mobile station 3 communicates with the base station 1 by using the radio frequency RF2. When the mobile station 3 comes to the point c, a hard hand-off operation is carried out to switch from the radio frequency RF2 to the radio frequency RF1.

The mobile station 3 uses the radio frequency RF1 between the point c and the point d. As the mobile station 3 moves away from the base station 1 and reaches a certain point between the point c and the point d, the mobile station 3 engages in a soft hand-off operation so as to communicate with both the base station 1 and the base station 2. When the mobile station 3 reaches a certain point sufficiently far away from the base station 1, the mobile station 3 disengages from the soft hand-off operation, and communicates only with the base station 2 by using the radio frequency RF1.

As it comes to the point d, the mobile station 3 performs a hard hand-off operation to switch from the radio frequency RF1 to the radio frequency RF2. Thereafter, the mobile station 3 uses the radio frequency RF2 to communicate with the base station 2.

In this manner, a mobile communication system of the present invention has a plurality of cells using respective radio frequencies and having respective area sizes (e.g., respective radii). The respective area sizes may be different from each other, and the radio frequency covering the largest area may have a cell that overlaps a counterpart cell of an adjacent base station. A soft hand-off operation between base stations may be performed only with respect to this radio frequency that covers the largest area. Within the same base station, a hard hand-off operation is performed to switch between different radio frequencies. Between different base stations, a soft hand-off operation is carried out to move from one station to another.

According to this configuration, a soft hand-off operation may be performed only with respect to the radio frequency of the largest cell, so that communication lines for other radio frequencies do not need a soft-hand-off function. Devices used on the base-station side can be thus simplified in terms of their circuit configurations.

A trigger may be necessary to initiate a hard hand-off operation at any one of the points b, c, and d as described above. To this end, the base station may periodically require the mobile station 3 to report received pilot strengths (e.g., may send a pilot measurement request to the mobile station 3). When receiving a pilot strength measurement message from the mobile station 3, the base station may estimate a position of the mobile station 3 based on the received message. If the position is found to be close to a cell boundary, an instruction to perform a hard hand-off operation is sent to the mobile station 3 to trigger a switch.

Alternatively, the mobile station may be instructed to constantly monitor received pilot strengths of surrounding base stations. The mobile stations may report a change of a received pilot strength as it crosses a predetermined threshold.

As previously described, the related-art CDMA-mobile-communication system allows mobile stations using any radio frequencies to perform a soft hand-off operation, so that all the mobile stations using any radio frequencies can move from one base station to another base station without disrupting their continuous communications. Such a system configuration tends to be costly. Further, since a hard hand-off operation is performed when requirements for a soft hand-off operation are not satisfied, such a hard hand-off operation interferes with communications of other mobile stations, limiting the number of mobile stations that can be accommodated within a single base station.

According to the principle of the present invention, a soft hand-off operation between adjacent base stations is performed only by using a selected radio frequency (RF1), and a hard hand-off operation is performed to switch between different radio frequencies (RF1 and RF2) within the same base station. In this configuration, resources (e.g., circuits such as those of selection units) of the base-station controller allocated to a mobile station currently using the radio frequency RF2 do not need such hardware and software as required for soft hand-off operations. This simplifies device configurations.

Where the area covered by the radio frequency RF2 has a radius smaller than that of the area covered by the radio frequency RF1, signals transmitted from the base station using the radio frequency RF2 can have smaller signal strength. This makes it possible to reduce power consumption in the high-power amplifier of the base station, and, also, reduces interference between adjacent cells. This helps to increase the number of mobile stations that can be accommodated in the base station.

With the related-art configuration, a mobile station needs to constantly monitor pilot strengths of surrounding base stations so as to be ready for a soft hand-off operation no matter what radio frequency is currently used. In the present invention, on the other hand, a mobile station using the radio frequency RF2, for which no soft hand-off operation is performed, can stop the monitoring operation of searching for pilot signals of surrounding base stations. That is, all that the searcher needs to do is to search for a delay profile of the multi-path components. This reduces power consumption in the mobile station.

In the following, embodiments of the present invention will be described with reference to the accompanying drawings.

[First Embodiment]

Figure 2:
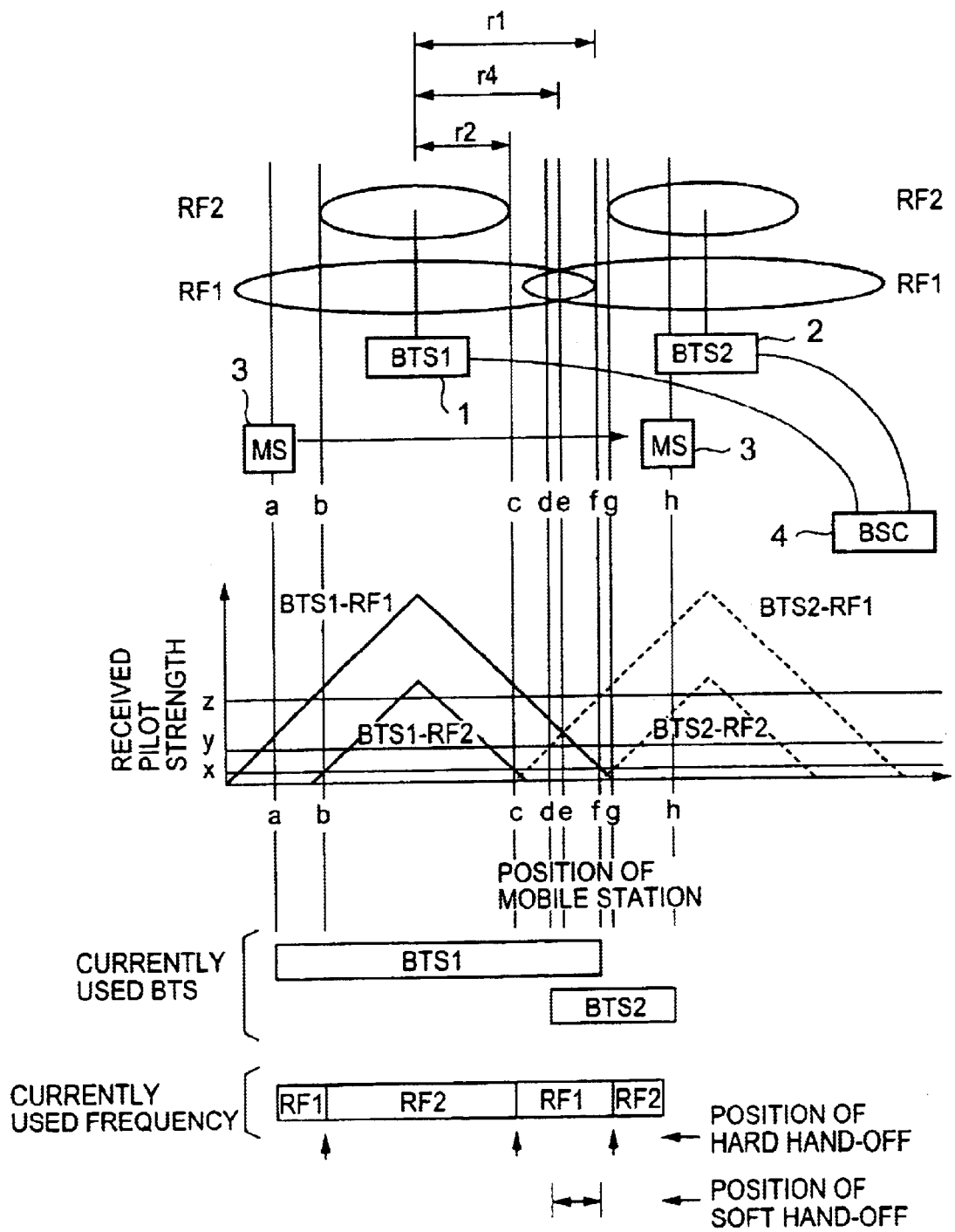
FIG. 2 is an illustrative drawing showing a CDMA mobile communication system according to a first embodiment of the present invention.

FIG. 2 is an illustrative drawing showing a CDMA mobile communication system according to a first embodiment of the present invention.

Figure 12:
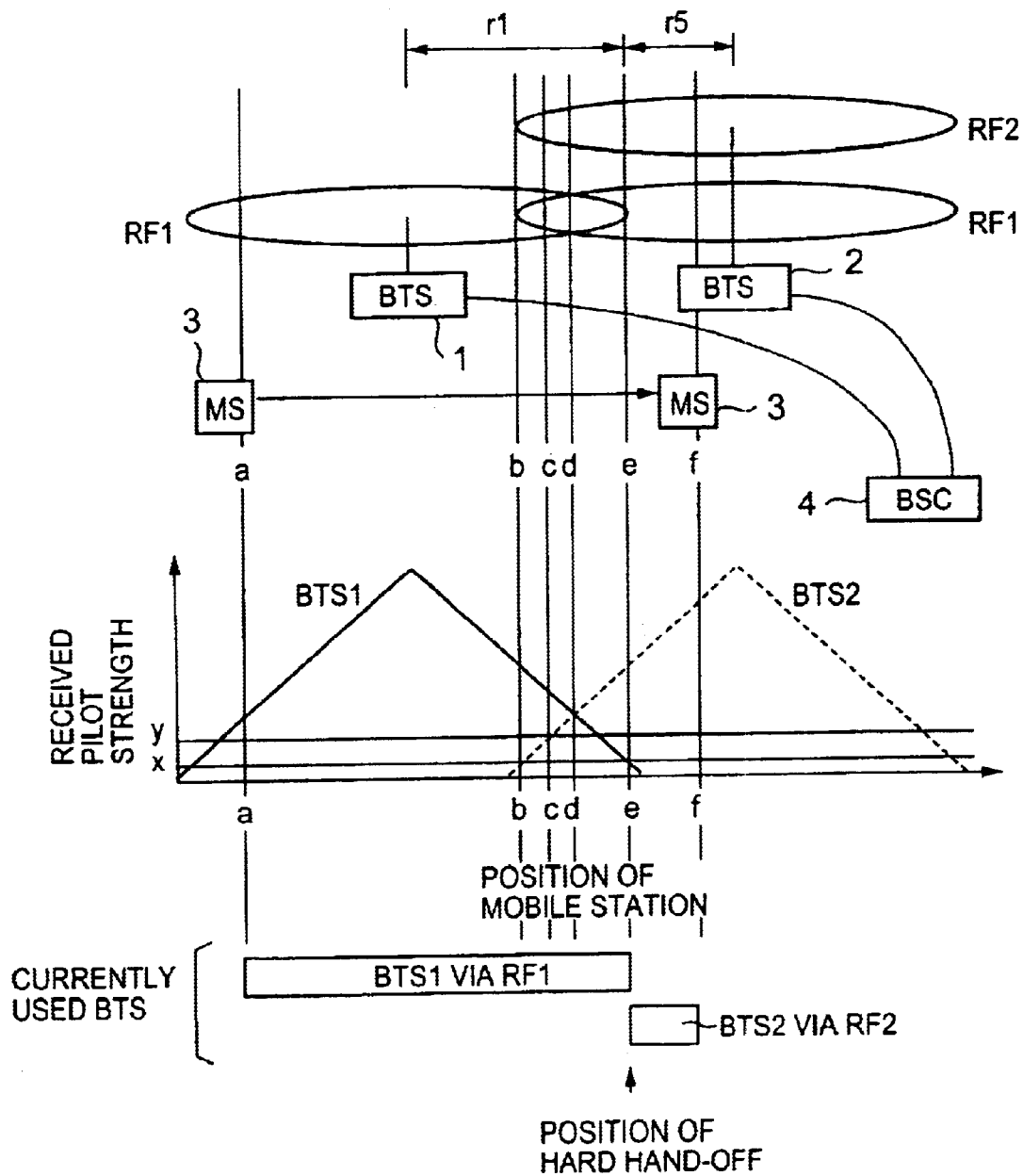
FIG. 12 is an illustrative drawing showing a hard hand-off operation performed by a mobile station.
Figure 13:
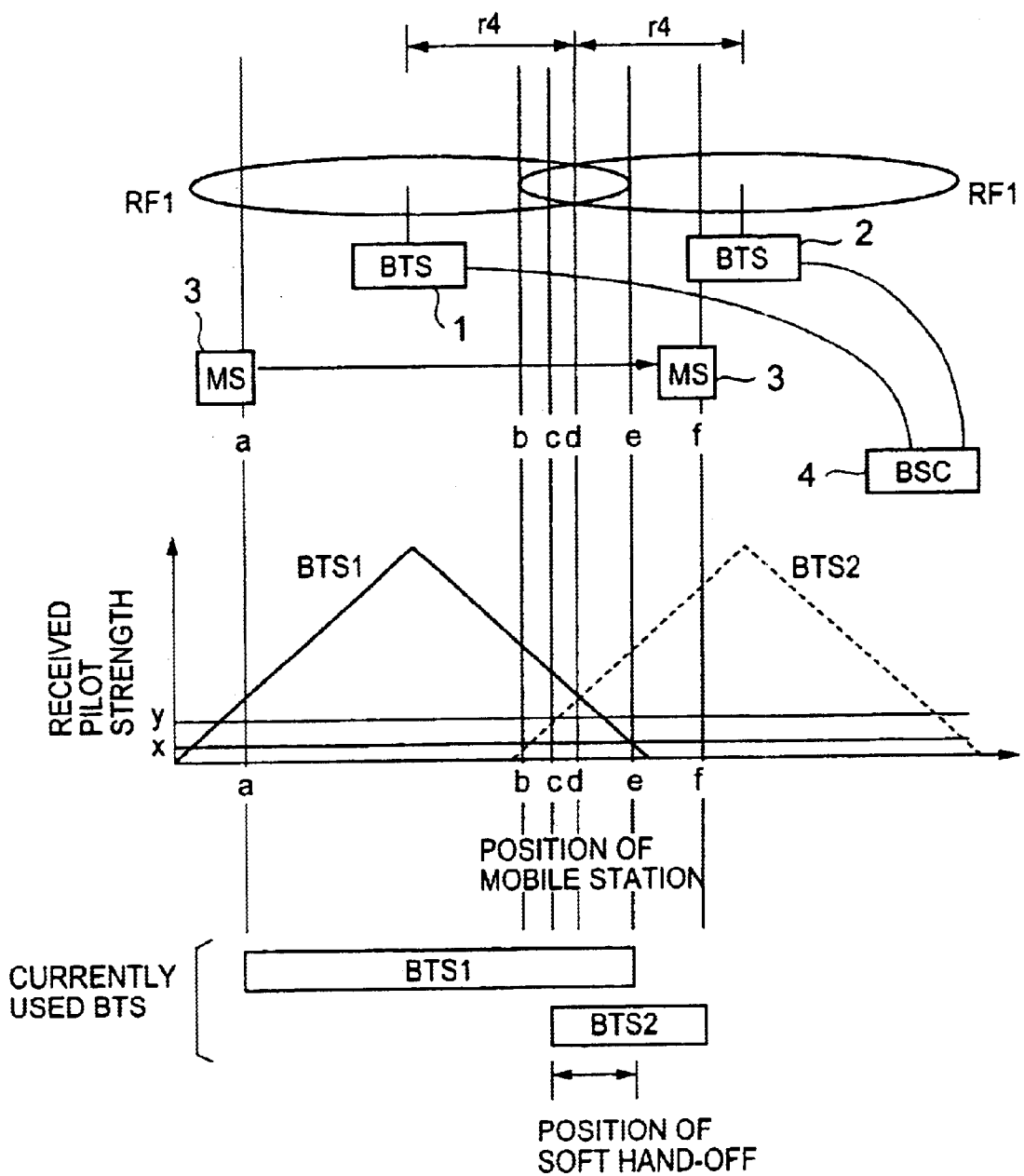
FIG. 13 is an illustrative drawing showing a soft hand-off operation performed by a mobile station.
Figure 14:
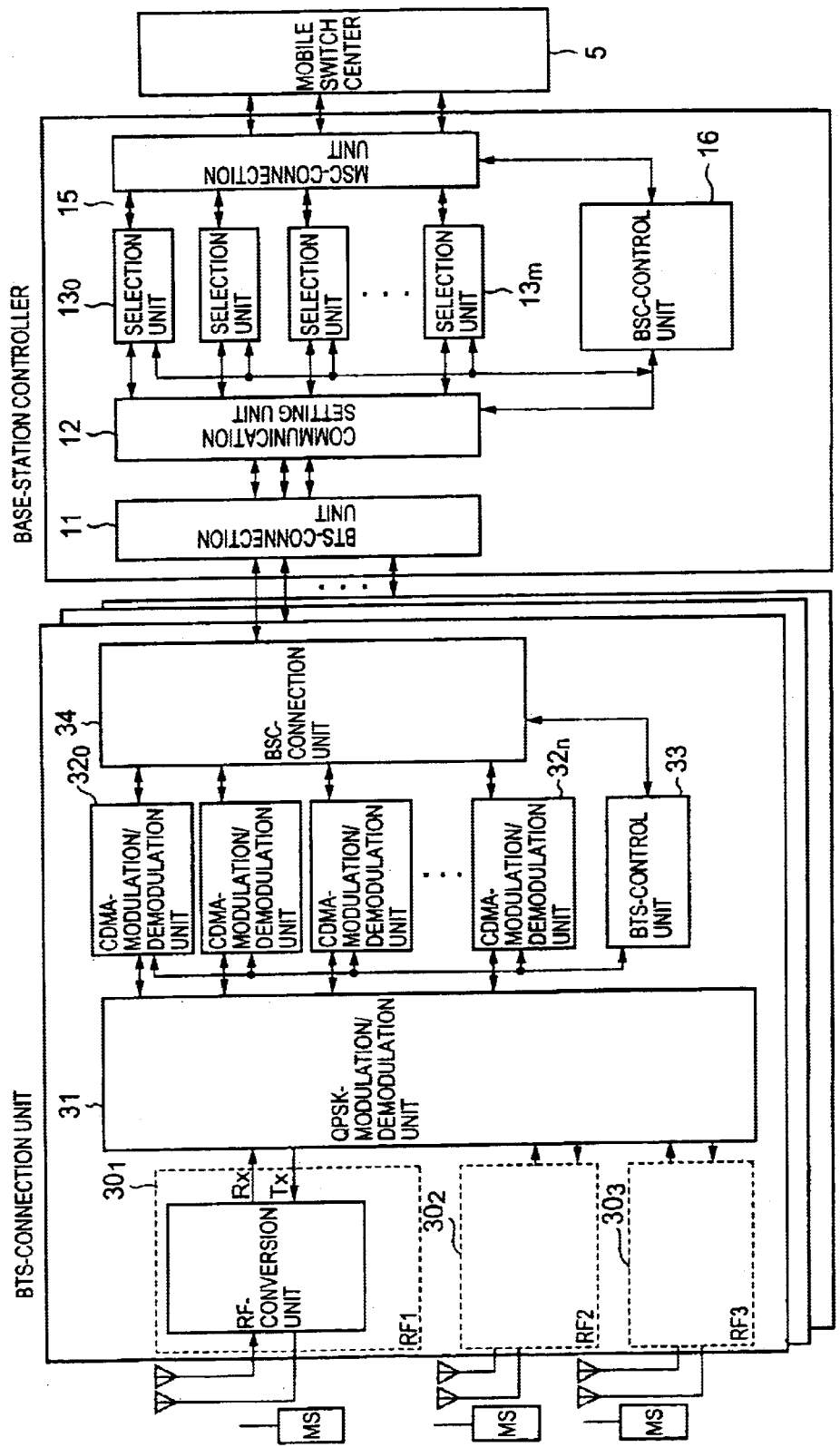
FIG. 14 is a block diagram showing a relate-dart configuration of a base station and a base-station controller.
Figure 15:
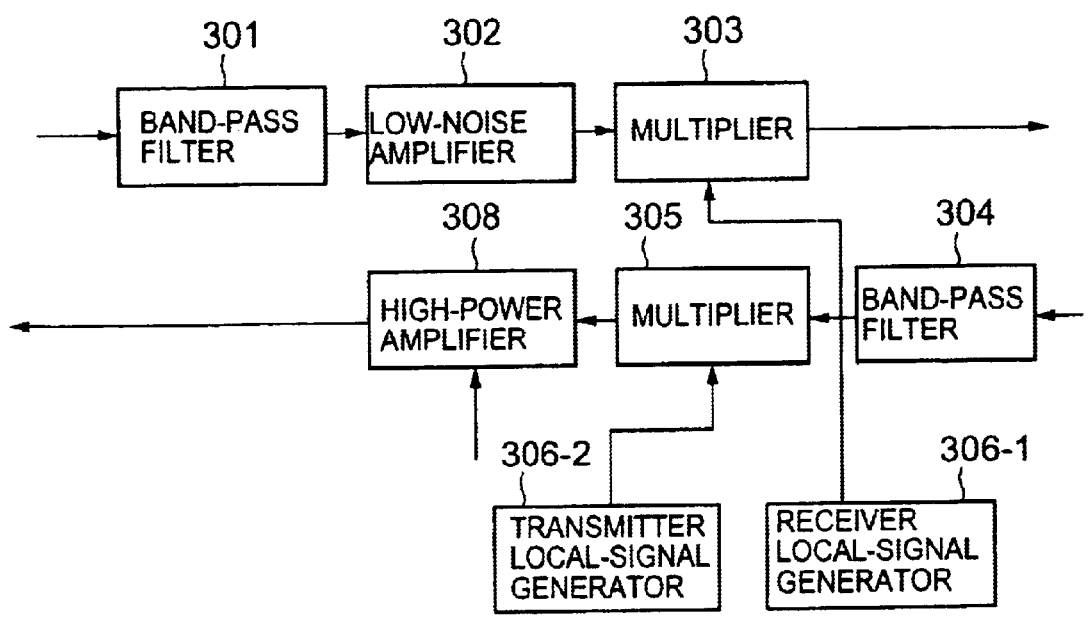
FIG. 15 is a block diagram of a RF-conversion unit of the base station of FIG. 14.

The same reference numerals as those of FIG. 12 are used in FIG. 2. FIG. 2 shows a cell configuration at the top, pilot strengths received by the mobile station 3 in the middle, and a base station and a radio frequency that the mobile station 3 is currently using at the bottom.

Each of the base stations 1 and 2 uses the radio frequency RF1 and RF2 to cover respective areas (cells). The area of the radio frequency RF1 has a radius r1 with a base station at a center thereof, and the area of the radio frequency RF2 has a radius r2 with the base station at a center thereof. The areas covered by the radio frequency RF1 are overlapped at a peripheral portion thereof between the base stations 1 and 2, thereby permitting a soft hand-off operation in the overlapping area.

In what follows, a description will be given with regard to a case in which the mobile station 3 moves from the point a to the point h in FIG. 2.

At the point a, the mobile station 3 starts communicating with the base station 1. The radio frequency RF1 is initially used. As the mobile station 3 moves toward the point b, a received pilot strength of the radio frequency RF1 gradually increases. At the point b, the received pilot strength of the radio frequency RF1 of the base station 1 exceeds z, which indicates a received pilot strength of the radio frequency RF1 that is observed when the mobile station 3 enters the cell of the radio frequency RF2. As this happens, the mobile station 3 reports this to the base-station controller 4 via the base station 1.

Upon receiving the report, the base-station controller 4 instructs the mobile station 3 to perform a hard hand-off operation to switch to the radio frequency RF2. In response, the mobile station 3 carries out a hard hand-off operation at the point b, and, thereafter, uses the radio frequency RF2 to communicate with the base station 1.

As the mobile station 3 moves further and comes closer to the point c, a received pilot strength of the radio frequency RF2 of the base station 1 decreases. Eventually, the received pilot strength of the radio frequency RF2 becomes smaller than x, which indicates a pilot strength usable for communication. The mobile station 3 notifies the base-station controller 4 via the base station 1.

The base-station controller 4 instructs the mobile station 3 to perform a hard hand-off operation to switch to the radio frequency RF1. In response, the mobile station 3 carries out a hard hand-off operation at the point c, and, thereafter, uses the radio frequency RF1 to communicate with the base station 1.

As the mobile station 3 further moves toward the point d, the radio frequency RF1 of the base station 2 appears with an increasing pilot strength. The received pilot strength of the radio frequency RF1 of the base station 2 eventually exceeds y, which indicates a pilot strength to trigger a hand-off operation. As this happens, the mobile station 3 notifies the base-station controller 4 via the base station 1.

The base-station controller 4 sends a resource request to the base station 2 with an aim of performing a soft hand-off operation, and instructs the base station 2 and the mobile station 3 to perform a soft hand-off operation as resources are secured. As a result, the mobile station 3 communicate with both the base station 1 and the base station 2. The base-station controller 4 selects one of two received data sets which has the best quality as one data set is received from the base station 1 and the other data set is received from the base station 2. The selected data set is sent to the mobile-switch center 5.

As the mobile station 3 moves further and comes close to the point f, the received pilot strength from the base station 1 becomes weak. Eventually, the received pilot strength of the radio frequency RF1 of the base station 1 falls below x, which is a pilot strength usable for communication. The mobile station 3 reports this to the base-station controller 4 via the base stations 1 and 2.

The base-station controller 4 instructs the base stations 1 and 2 and the mobile station 3 to finish the soft hand-off operation. As a result, the mobile station 3 communicates only with the base station 2 by using the radio frequency RF1.

As the mobile station 3 moves toward the point g, a received pilot strength of the radio frequency RF1 of the base station 2 gradually increases. In the end, the received pilot strength exceeds z, which is defined as the received pilot strength of the radio frequency RF1 that is observed when the mobile station 3 enters the cell of the radio frequency RF2. As this happens, the mobile station 3 reports this to the base-station controller 4 via the base station 2.

In response, the base-station controller 4 instructs the mobile station 3 to perform a hard hand-off operation so as to switch to the radio frequency RF2. The mobile station 3 carries out the hard hand-off operation at the point g.

The hand-off operations as described above are repeated as the mobile station 3 shifts its position from cell to cell.

Figure 3:
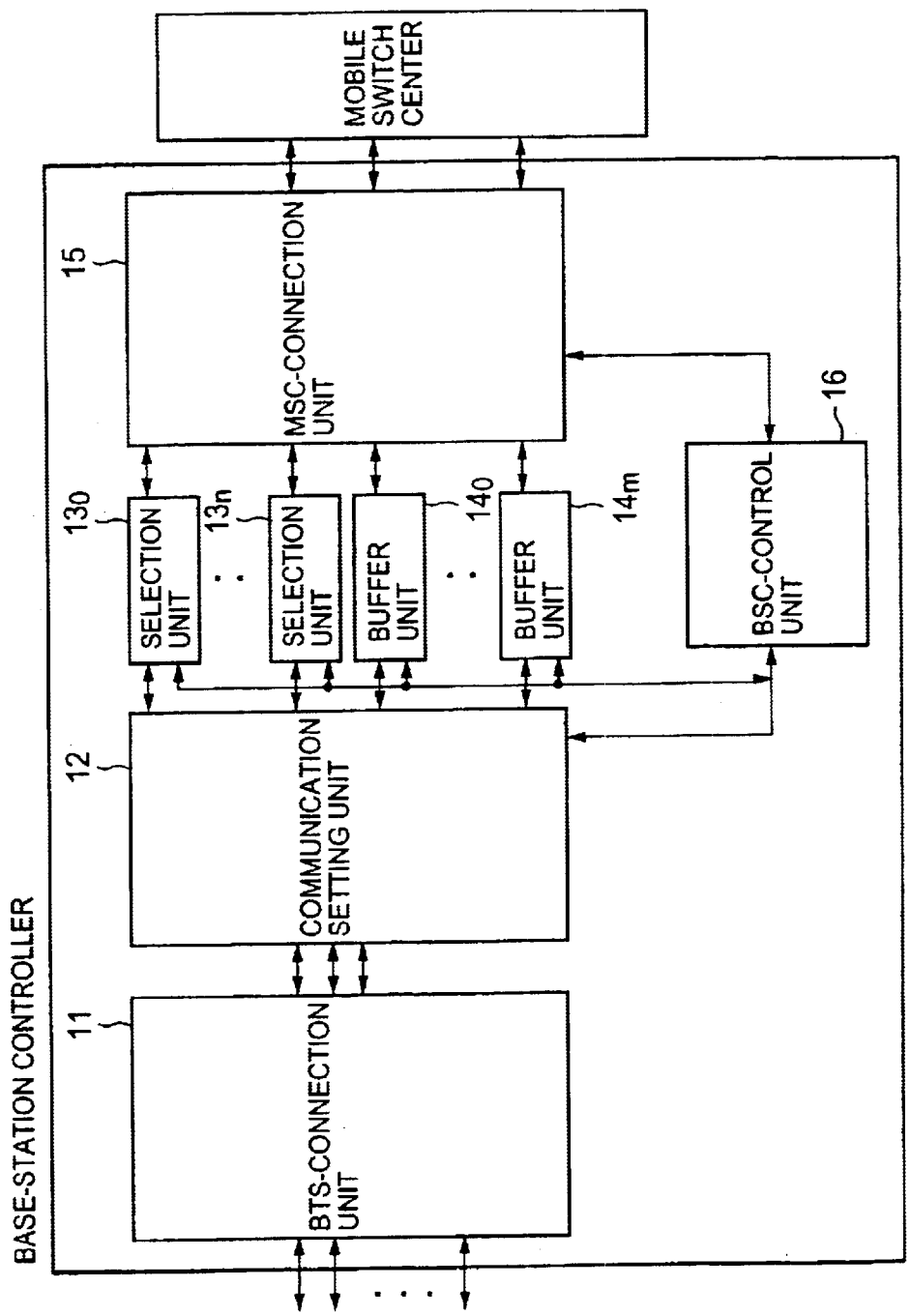
FIG. 3 is a block diagram of a base-station controller according to the first embodiment of the present invention.

FIG. 3 is a block diagram of a base-station controller according to the first embodiment of the present invention.

Figure 16:
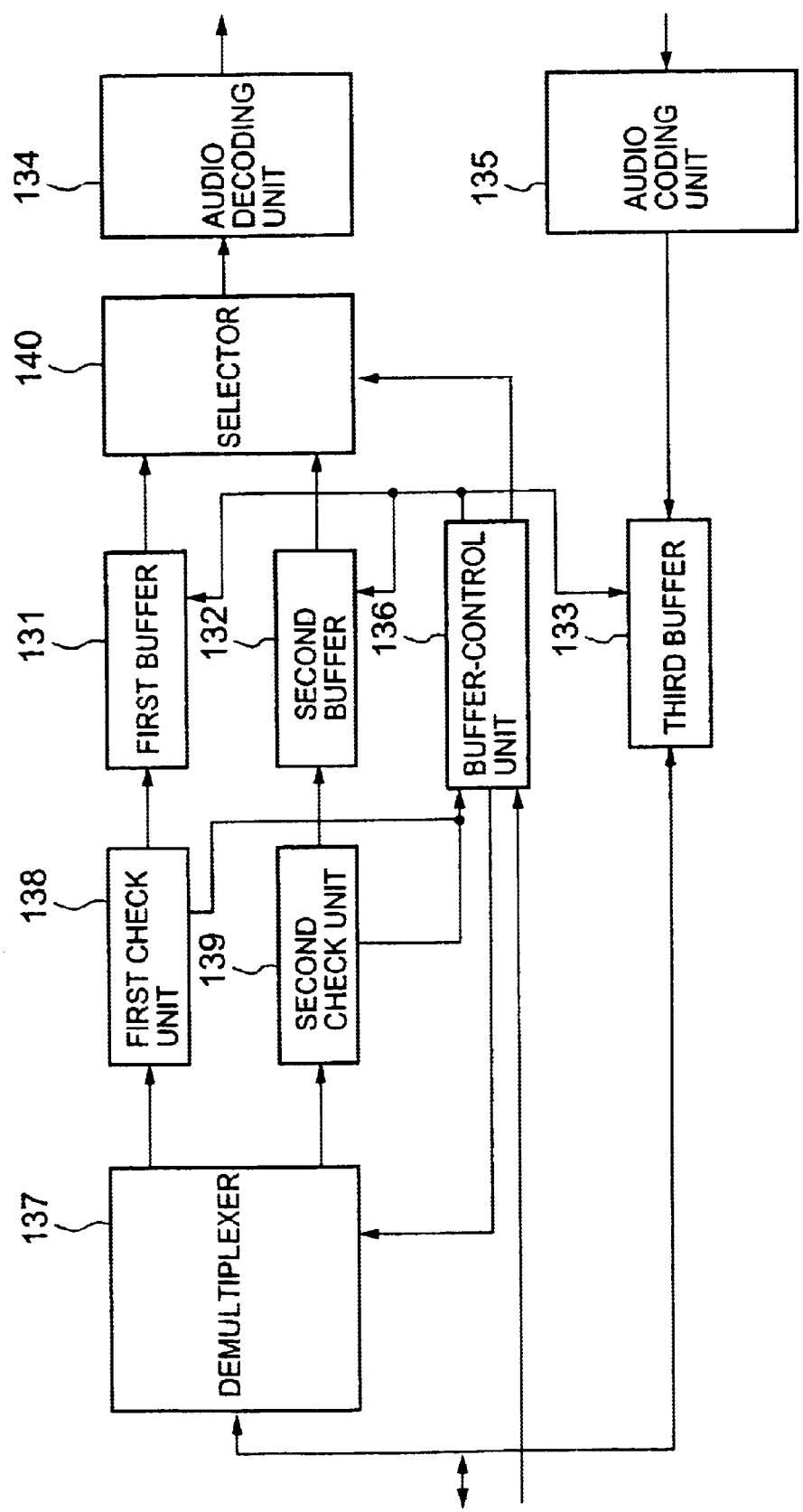
FIG. 16 is a block diagram of a selection unit of the base-station controller of FIG. 14.

The base-station controller shown in FIG. 3 differs from that of the related-art in configurations of the selection units 13. In the related art, every one of the selection units $13_0$ through $13_m$ of the base-station controller 4 has the configuration shown in FIG. 16. In the present invention, selection units $13_0$ through $13_n$ have the same configuration as that of FIG. 16, and are used for mobile stations 3 currently using the radio frequency RF1. In addition, buffer units $14_0$ through $14_m$ are allocated to the mobile stations 3 currently using the radio frequency RF2.

Figure 4:
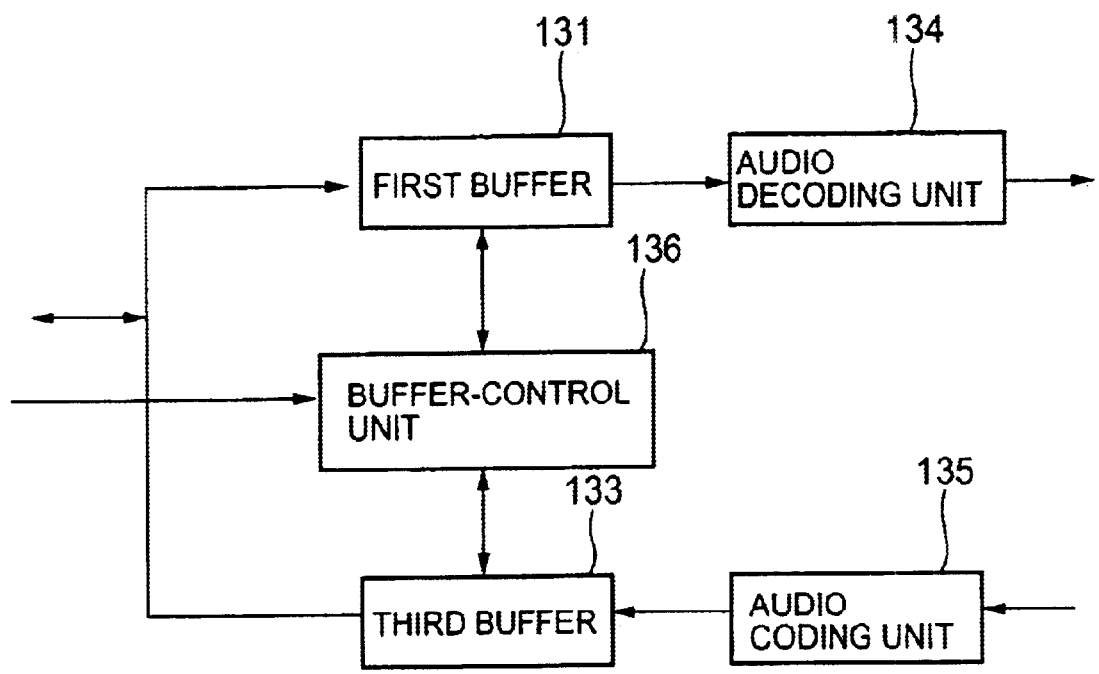
FIG. 4 is a block diagram of a buffer unit.

FIG. 4 is a block diagram of a buffer unit 14. The buffer unit 14 is any one of the buffer units $14_0$ through $14_m$.

As shown in FIG. 4, the buffer unit 14 includes only the first buffer 131, the third buffer 133, the audio decoding unit 134, the audio coding unit 135, and the buffer-control unit 136. Other elements present in the configuration of FIG. 16 such as the demultiplexer 137, the first check unit 138, the second check unit 139, the second buffer 132, and the selector 140 are removed. Namely, the buffer unit 14 includes the first buffer 131 and the audio decoding unit 134 on the receiver side thereof, and includes the third buffer 133 and the audio coding unit 135 on the transmitter side thereof. The buffer unit 14 has such a simplified configuration because the mobile stations 3 currently using the radio frequency RF2 do not perform soft hand-off operations and there is no need for the buffer unit 14 to be equipped with a function to perform a soft hand-off operation.

The base-station controller 4 needs to switch between use of the selection unit 13 and use of the buffer unit 14 as a hard hand-off operation is performed between the radio frequency RF1 and the radio frequency RF2, and such a switch needs to be made at the same timing as the hard hand-off operation. This switching function may be provided by utilizing a communication-line switching function of the communication setting unit 12 and the MSC-connection unit 15, which are present in the related-art system.

As described above, the selection function of the selection unit 13 needs to be provided only for a portion relevant to the radio frequency RF1. This is because only the mobile stations 3 using the radio frequency RF1 can perform a soft hand-off operation. Since other mobile stations 3 using other radio frequencies do not need a soft hand-off function, such a selection function is not necessary for portions corresponding to the other frequencies (e.g., RF2). In the portions corresponding to the other frequencies, therefore, the number of device elements can be reduced by removing the demultiplexer, the check units, one of the buffers, and the selector.

The present invention is not limited to the configuration as described above in which the system uses only two radio frequencies. It is apparent that the present invention is equally applicable to a configuration where the system uses more than two radio frequencies.

[Second Embodiment]

Figure 5:
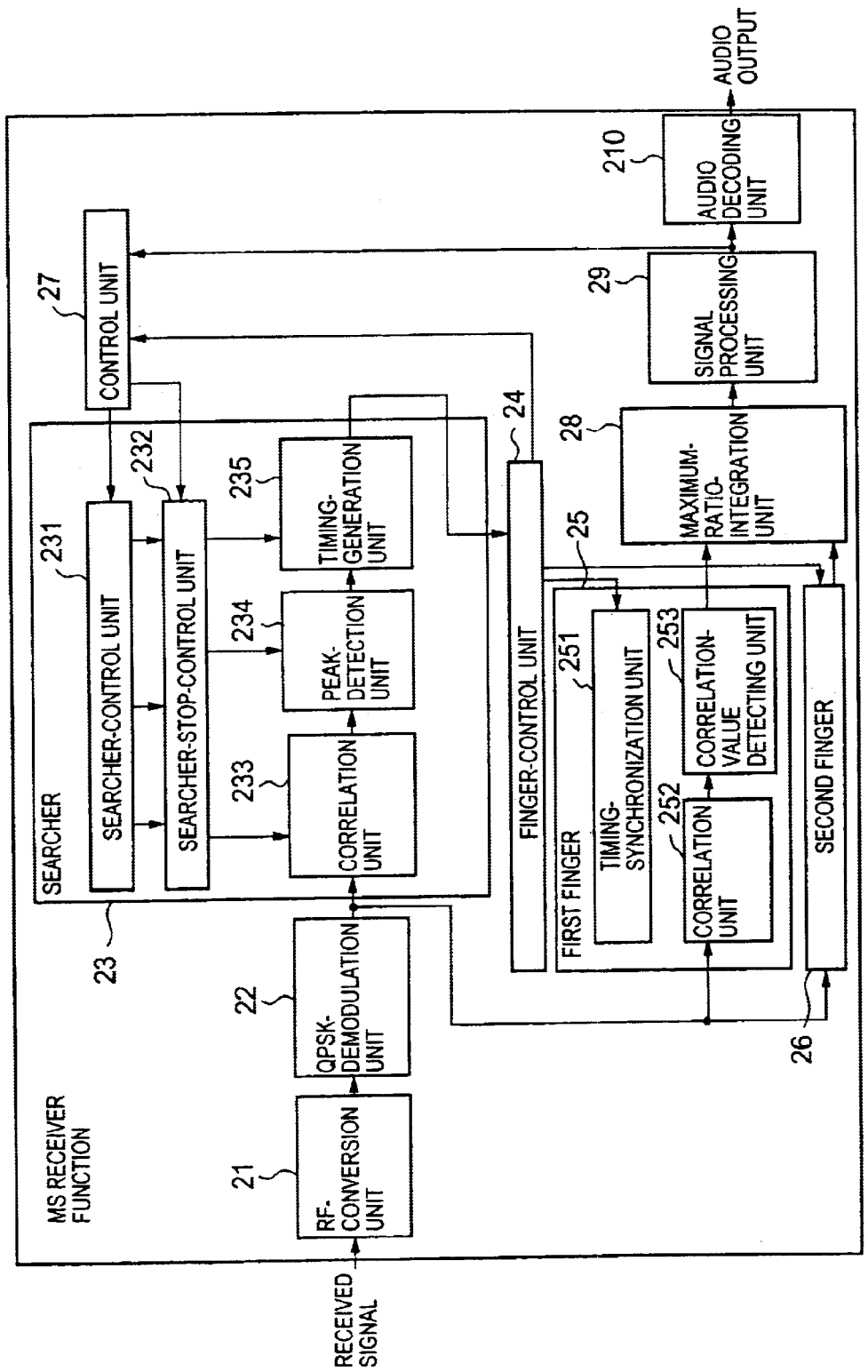
FIG. 5 is a block diagram of a receiver portion of a mobile station used in a CDMA mobile communication system according to a second embodiment of the present invention.

FIG. 5 is a block diagram of a receiver portion of a mobile station used in a CDMA mobile communication system according to a second embodiment of the present invention. In FIG. 5, the same elements as those of FIG. 17 are referred to by the same numerals, and a description thereof will be omitted.

Figure 17:
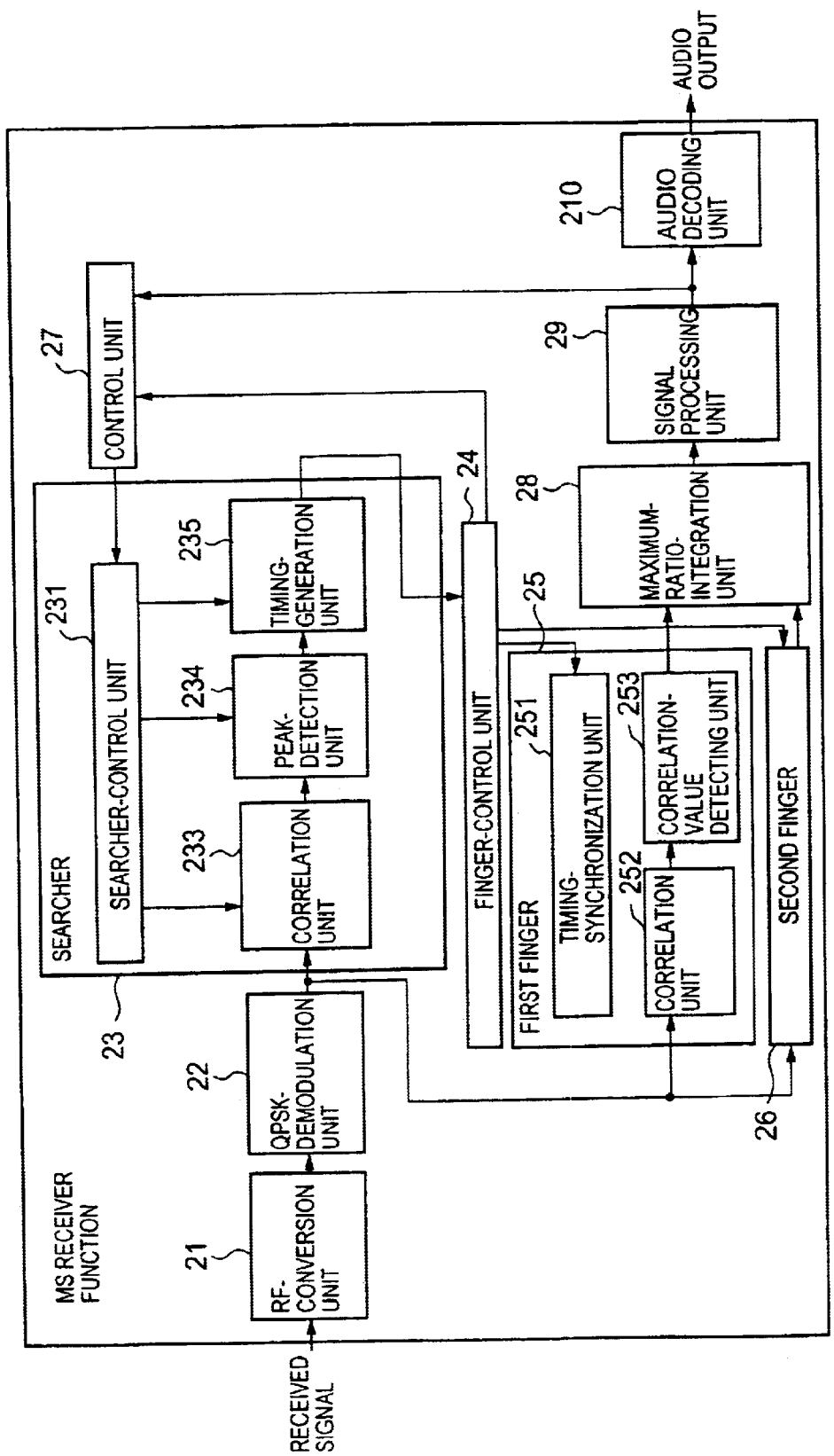
FIG. 17 is a block diagram of a receiver portion of a related-art mobile station.

A configuration of FIG. 5 differs from that of FIG. 17 only in a searcher-stop-control unit 232 is newly provided in the searcher 23.

The searcher-stop-control unit 232 blocks a function of the searcher 23 (i.e., stops the operation of the searcher 23) in response to an instruction from the control unit 27 when the function of the searcher 23 is to search for pilot signals of surrounding base stations. The blocking of the function is effected when the mobile station 3 uses the radio frequency RF2, and, thus, does not perform a sort hand-off operation.

The searcher 23 is generally responsible for two functions. One is to search for pilot signals of surrounding base stations, and the other is to search for multi-path components of communicated signals. In the second embodiment of the present invention, a mobile station using a radio frequency that permits no soft hand-off operation does not search for pilot signals of the surrounding base stations, and only searches for multi-path components. This reduces the load on the mobile station 3 in terms of use of hardware and software thereof, thereby achieving a reduction in power consumption.

Radio frequencies that do not permit a soft hand-off operation may be reported to the mobile station 3 as configuration information in advance, or may be reported to the mobile station 3 by a message sent from one of the base stations 1 and 2 and the base-station controller 4. In the latter case, the mobile station 3 does not have to have identifications of radio frequencies that do not permit a soft hand-off operation, but can acquire the identifications through messages sent from the base stations. This provides flexibility for changes in the system configuration.

[Third Embodiment]

Figure 6:
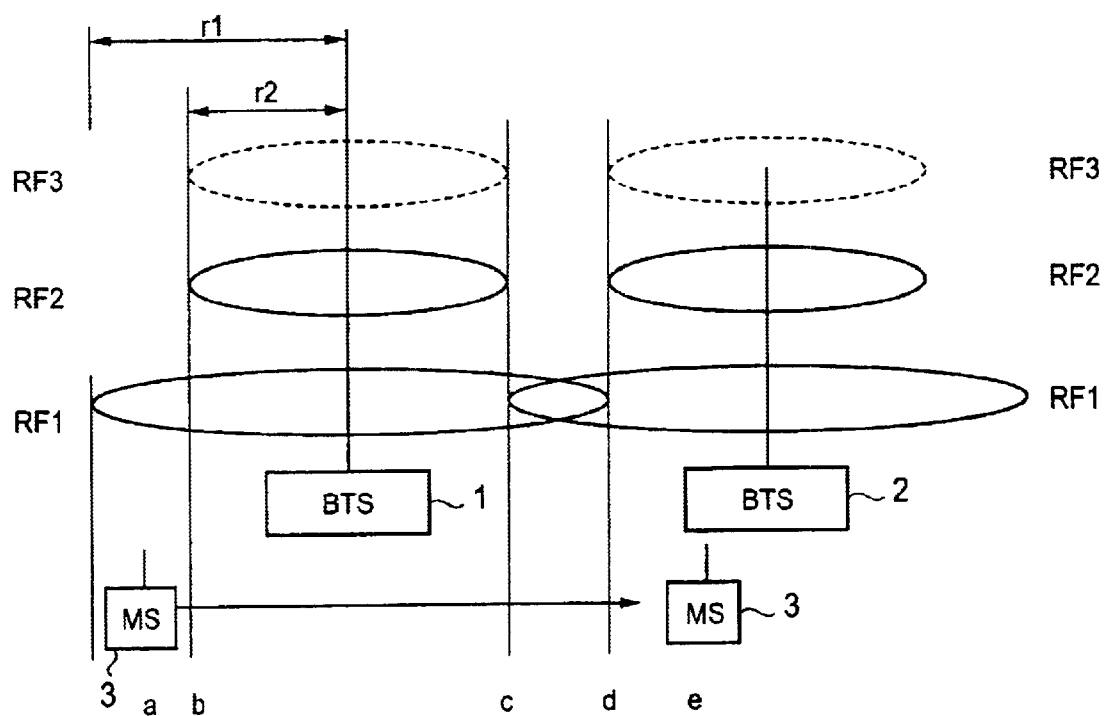
FIG. 6 is an illustrative drawing showing a cell configuration of a CDMA mobile communication system according to a third embodiment of the present invention.
Figure 7:
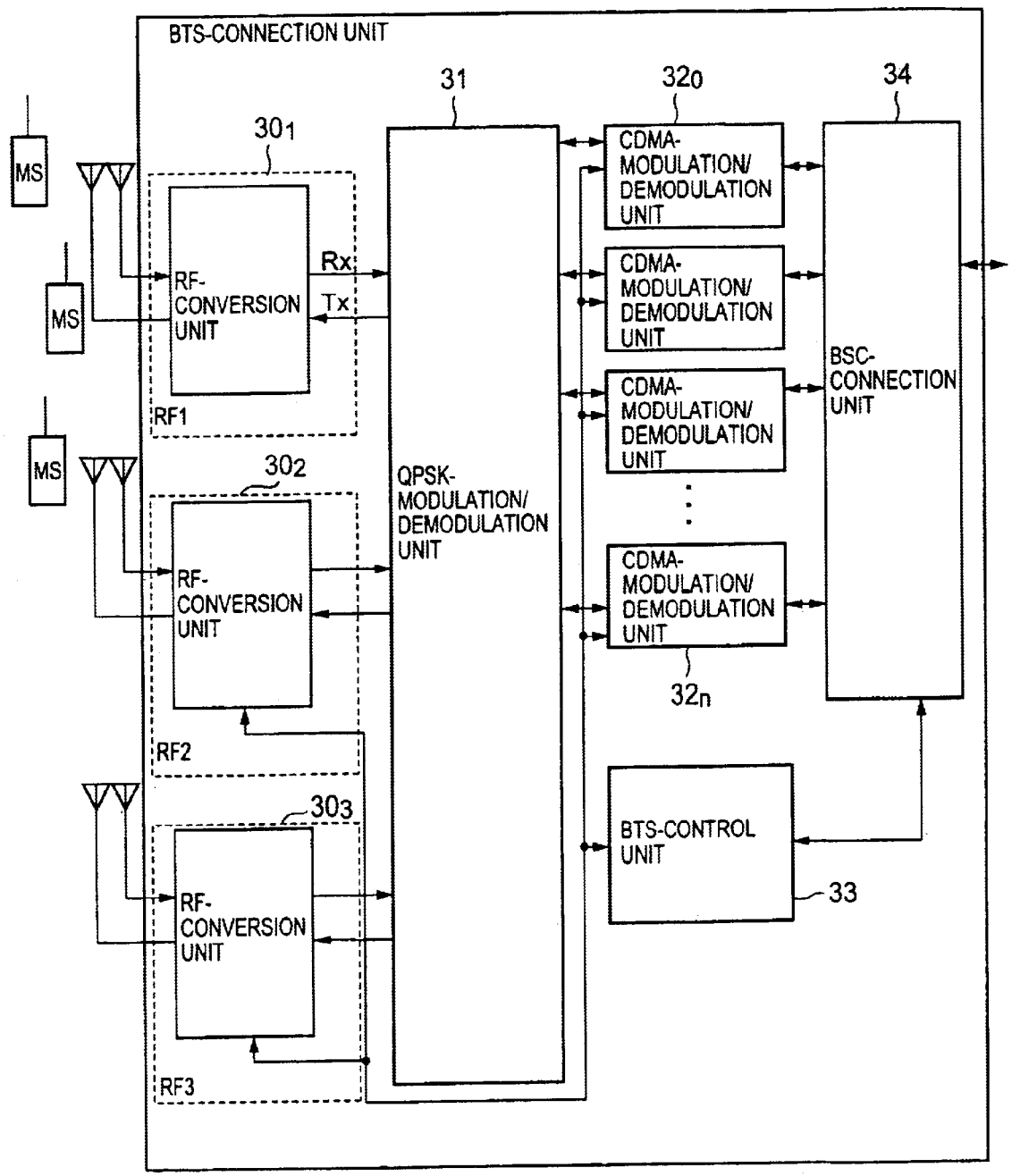
FIG. 7 is a block diagram of a base station according to the third embodiment of the present invention.
Figure 8:
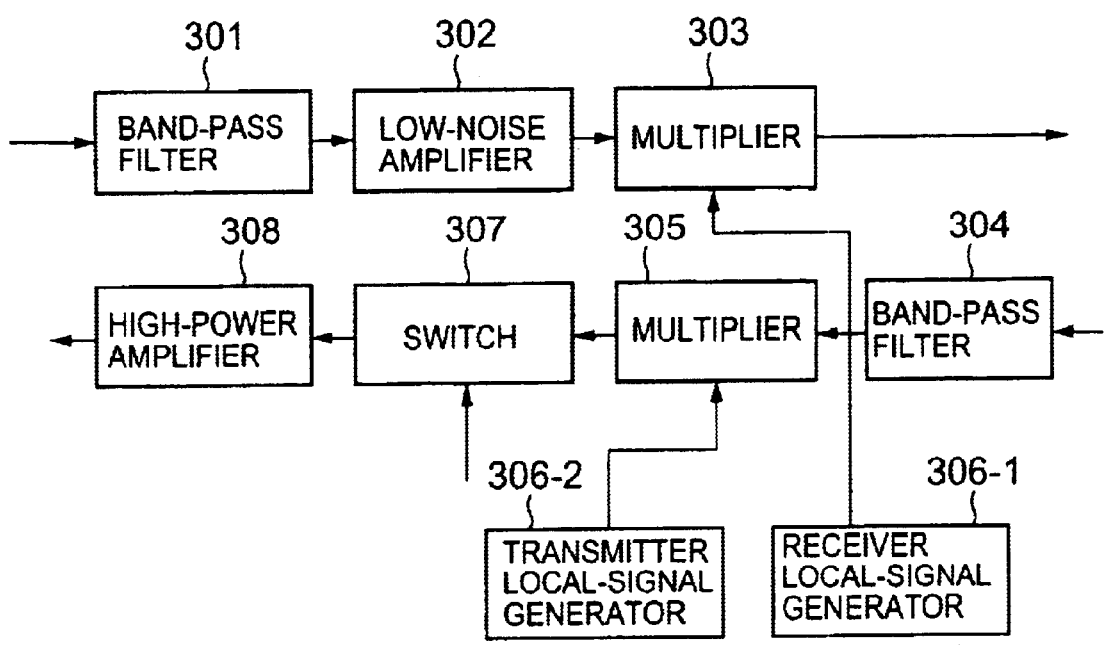
FIG. 8 is a block diagram of a RF-conversion unit used in the base station of FIG. 7.

FIG. 6 is an illustrative drawing showing a cell configuration of a CDMA mobile communication system according to a third embodiment of the present invention. FIG. 7 is a block diagram of a base station according to the third embodiment of the present invention. FIG. 8 is a block diagram of a RF-conversion unit used in the base station of FIG. 7.

As shown in FIG. 6, the base stations 1 and 2 use a radio frequency RF3 for wireless communication in addition to the radio frequencies RF1 and RF2. An area covered by the radio frequency RF3 has the radius r2 the same as that of the area covered by the radio frequency RF2.

As shown in FIG. 7, a base station of the third embodiment includes the RF-conversion units $30_1$ through $30_3$ used for the radio frequencies RF1 through RF3, respectively. In the third embodiment, the RF-conversion units $30_2$ and $30_3$ have a configuration as shown in FIG. 8, and differs from that of the RF-conversion unit $30_1$ in that a switch 307 is newly provided. The switch 307 serves to switch on/off an input to the high-power amplifier 308 in response to an instruction from the BTS-control unit 33. This makes it possible to switch on/off communications by the radio frequencies RF2 and RF3.

In the base station, the BTS-control unit 33 knows the number of mobile stations 3 currently engaging in a call with respect to each radio frequency. This information is provided as communication-line-setting information. In the configuration of FIG. 7, the BTS-control unit 33 is provided with a function to detect the number of mobile stations 3 using the radio frequency RF1 and currently engaging in a call. Depending on the detection result, transmission of the radio frequency RF2 from the RF-conversion unit $30_2$ is either switched on or switched off.

Initially, communications with the mobile stations 3 are conducted by using only the radio frequency RF1. When the number of mobile stations 3 using the radio frequency RF1 and currently engaging in a call increases and approaches to an upper limit thereof, transmission using the radio frequency RF2 is commenced. At the same time, the base station has part or all of the mobile stations 3 report received pilot strengths of the radio frequency RF1 as long as the mobile stations 3 are currently engaging in a call and using the radio frequency RF1. If a pilot strength received by a given mobile station 3 is greater than a given threshold, it is ascertained that this mobile station 3 is positioned sufficiently close to the base station, i.e., is positioned within the cell of the radio frequency RF2. In this case, an instruction is sent to this mobile station 3 to perform a hard hand-off operation to switch to the radio frequency RF2. In this manner, the number of mobile stations 3 receiving services via the radio frequency RF1 is reduced, thereby making room for additional mobile stations 3.

By the same token, the BTS-control unit 33 of the base station is provided with a function to detect the number of mobile stations 3 receiving services via the radio frequency RF2. Depending on the detected number, transmission of the radio frequency RF3 is switched on or off. This insures that the radio frequency RF2 has room to accept new mobile stations 3 switching from the radio frequency RF1 via hard hand-off operations.

Some measures may be taken in order to prevent transmission of the radio frequencies RF2 and RF3 from switching on/off too frequently. For example, the number of mobile stations 3 for triggering or stopping transmission of the radio frequencies RF2 and RF3 may be given a hysteresis characteristic, or may be disregarded for a predetermined time period.

Under such control as described above, transmission of the radio frequencies RF2 and RF2 are stopped to render communication services by using only the radio frequency RF1 when only a small number of mobile stations 3 are engaging in a call via a base station. This reduces power consumption in the base station. Further, this configuration can reduce an interfering effect on other mobile stations using other base stations.

In the third embodiment described above, the two radio frequencies RF2 and RF3 are used via hard hand-off switching. The present invention is not limited to this configuration, but is applicable to a case where only one radio frequency (e.g., RF2) is used via a hard hand-off operation. When the number of mobile stations 3 is small, only the radio frequency RF1 is transmitted. As the number of the mobile stations 3 increases, the radio frequency RF2 is transmitted to allow the mobile stations 3 to switch from the radio frequency RF1 to the radio frequency RF2 via a hard hand-off operation. Further, the present invention is equally applicable to a case where more than two radio frequencies are used via hard hand-off operations.

[Fourth Embodiment]

Figure 9:
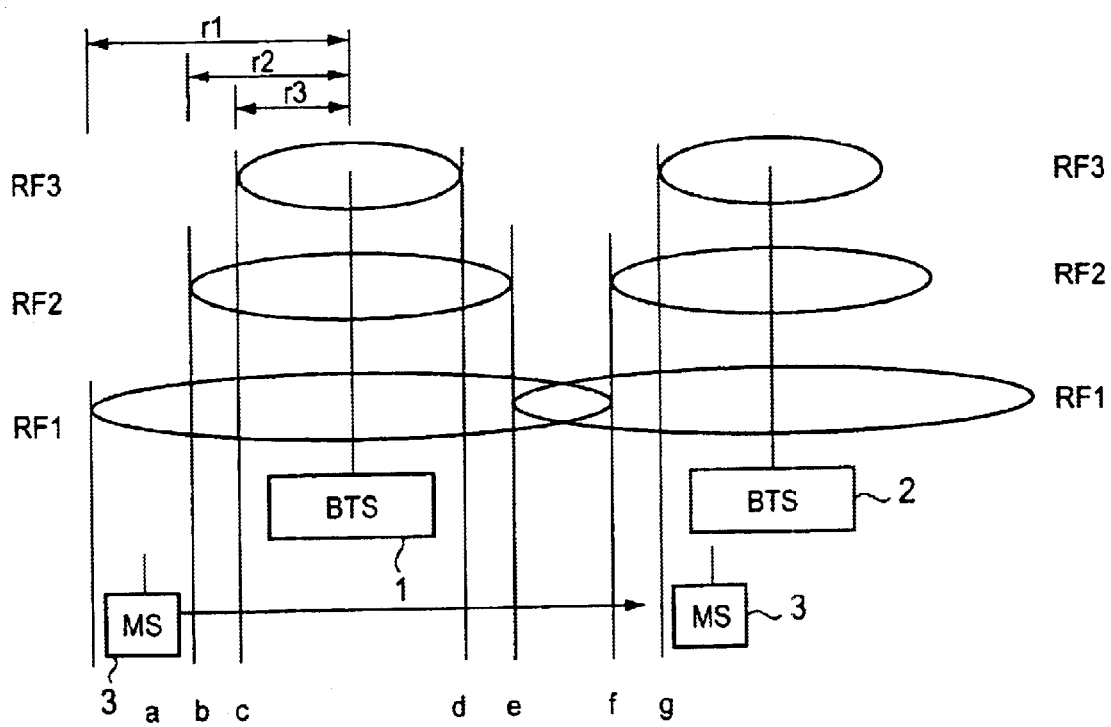
FIG. 9 is an illustrative drawing showing a cell configuration of a CDMA mobile communication system according to a fourth embodiment of the present invention.
Figure 10:
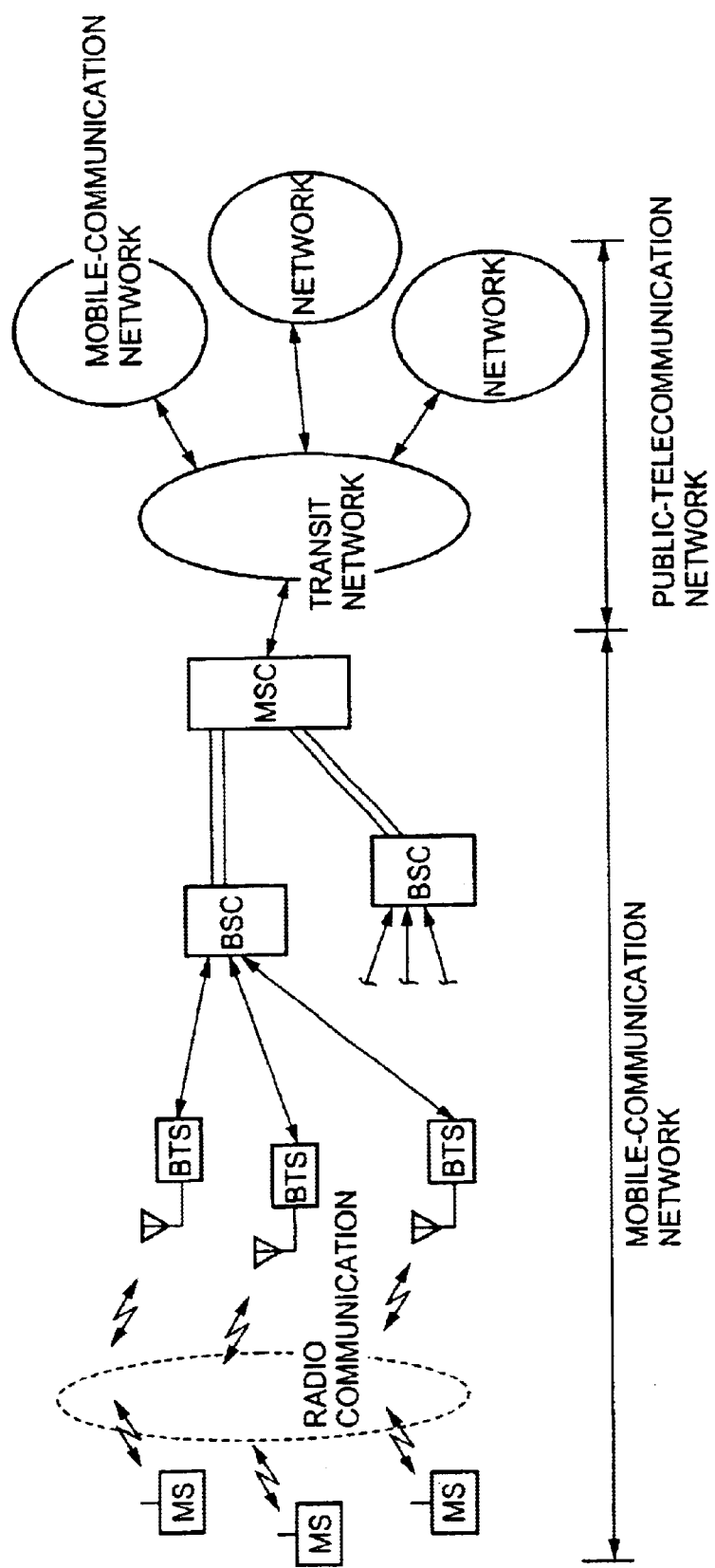
FIG. 10 is an illustrative drawing showing a configuration of a typical related-art mobile-communication system.
Figure 11:
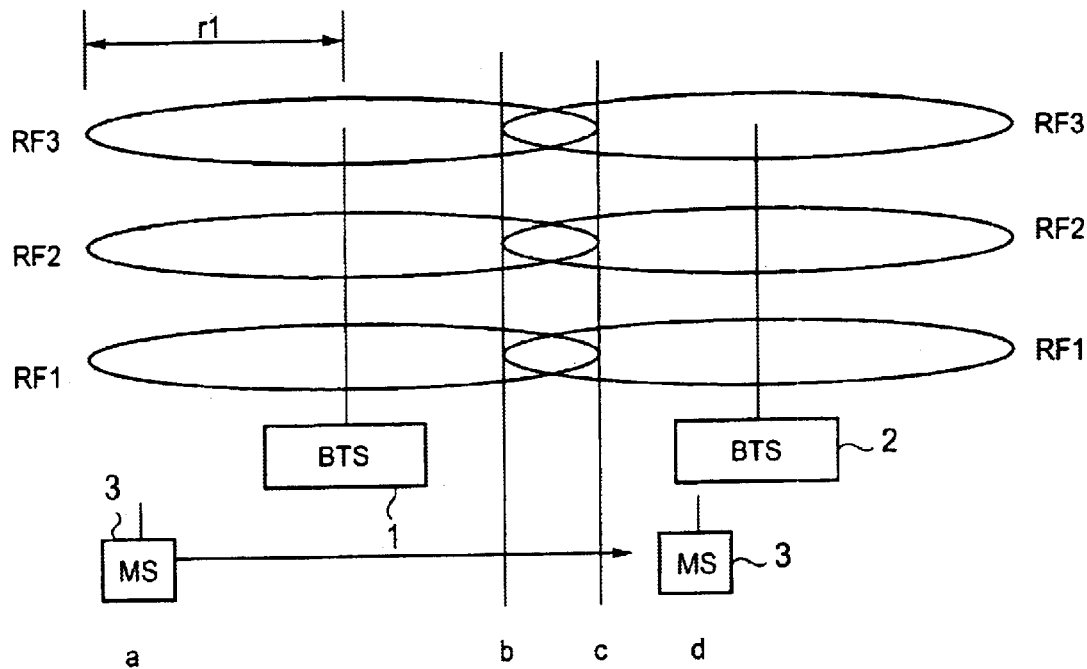
FIG. 11 is an illustrative drawing showing a configuration of cells of related-art base stations that employ a CDMA scheme.

FIG. 9 is an illustrative drawing showing a cell configuration of a CDMA mobile communication system according to a fourth embodiment of the present invention.

In the fourth embodiments, two radio frequencies RF2 and RF3 are used as in the third embodiment, but they have different area sizes from each other in contrast to the same area size of the third embodiment. An area covered by the radio frequency RF2 has a radius r2, and an area covered by the radio frequency RF3 has a radius r3 smaller than the radius r2. In the fourth embodiment, further, transmission of the radio frequencies RF2 and RF3 is not controlled in terms of switching on/off thereof.

With the smaller radius r3 of the radio frequency RF3 compared with that of the radio frequency RF2, the mobile stations 3 are switched from the radio frequency RF2 to the radio frequency RF3 if the mobile stations 3 currently using the radio frequency RF2 are positioned sufficiently close to the base station. Because of the smaller radius r3 of the radio frequency RF3, transmission power of the base station can be smaller for the radio frequency RF3, thereby achieving a reduction in power consumption.

Various modifications can be made to the embodiments of present invention. The embodiments have been described with reference to examples in which two or three radio frequencies are used. The present invention is not limited to these examples, but is applicable to use of any larger number of radio frequencies.

The number of radio frequencies (e.g., RF1) permitting a soft hand-off operation is not limited to one, but can be more than one. What is important is to provide radio frequencies (e.g., RF2 and RF3) offering no soft hand-off functions in addition to radio frequencies (e.g., RF1) permitting a soft hand-off operation. With this configuration, soft hand-off operations are performed only with respect to the radio frequencies (e.g., RF1) that permit a soft hand-off operation.

Further, the embodiments have been described with reference to a case where the areas covered by the hard-hand-off radio frequencies RF2 and RF3 are smaller than the area covered by the soft-hand-off radio frequency RF1. The present invention is not limited to this configuration, but is applicable to a case where all the areas have the same area size. In such a case, conditions that trigger hard hand-off switching from the radio frequency RF1 to the radio frequency RF2 may be determined as they are appropriate. This configuration is based on a premise that the number of radio frequencies permitting soft hand-off operations should be limited. With such a configuration, selection units of a base-station controller and searchers of mobile stations can be simplified in terms of structures thereof although no effect is expected to bring about an increase in the number of mobile stations that can be accommodated in a base station.

The present invention is applicable to any system that performs any hand-off operations similar to those described above, and a type of hand-off operation is not limited to that of IS-95-A.

Further, the present invention is not limited to these embodiments, but various variations and modifications may be made without departing from the scope of the present invention.

The present application is based on Japanese priority application No. 10-297709 filed on Oct. 20, 1998, with the Japanese Patent Office, the entire contents of which are hereby incorporated by reference.

What is claimed is:

1. A system for mobile communication based on code division multiple access, comprising:

base stations, each of which communicates with mobile stations by using a plurality of radio frequencies covering respective cells, the respective cells including a first cell covered by a first radio frequency and a second cell covered by a second radio frequency, wherein each of said base stations transmits the first radio frequency when a number of the mobile stations belonging to the first cell thereof is smaller than a given threshold, and transmits the second radio frequency in addition to the first radio frequency when the number exceeds the given threshold, thereby controlling some of the mobile stations to switch from the first cell to the second cell as transmission of the second radio frequency starts.

2. The system as claimed in claim 1, wherein the respective cells further include a third cell covered by a third frequency, and each of said base stations does not transmit the third radio frequency when a number of the mobile stations belonging to the second cell thereof is smaller than another given threshold, and transmits the third radio frequency in addition to the second radio frequency when the number exceeds said another given threshold, thereby controlling some of the mobile stations to switch from the second cell to the third cell as transmission of the third radio frequency starts.

3. The system as claimed in claim 1, wherein transmission and non-transmission of the second frequency is determined by incorporating a hysteresis characteristic into a relation between the number of the mobile stations and the given threshold.

4. The system as claimed in claim 1, wherein a period of transmission and a period of non-transmission of the second frequency is controlled to last for at least a predetermined time period.

5. The system as claimed in claim 1, wherein the first cell of one of said base stations overlaps the first cell of another one of said base stations and the second cell of the one of said base stations do not overlap the second cell of said another one of said base stations.

6. A base-station controller used in a code-division-multiple-access mobile communication system, comprising:

first units, each of which decodes a signal sent from a mobile station, and is provided with a selection function to select said signal from two signals that are sent from the mobile station as a single signal and routed through two respective base stations; and second units, each of which decodes a signal sent from a mobile station, and is not provided with the selection function, wherein a mobile station using a radio frequency permitting a soft hand-off operation is assigned to one of said first units, and a mobile station using a radio frequency not permitting a soft-hand-off operation is assigned to one of said second units.

* * * * *